(12) United States Patent
Tanimoto et al.

(10) Patent No.: US 8,030,398 B2
(45) Date of Patent: Oct. 4, 2011

(54) METHOD FOR PRODUCING A (METH)ACRYLIC RESIN EMULSION

(75) Inventors: Seiji Tanimoto, Okayama (JP); Naoki Fujiwara, Okayama (JP)

(73) Assignee: Kuraray Co., Ltd., Okayama (JP)

( * ) Notice: Subject to any disclaimer, the term of this patent is extended or adjusted under 35 U.S.C. 154(b) by 1057 days.

(21) Appl. No.: 10/550,025

(22) PCT Filed: Mar. 31, 2004

(86) PCT No.: PCT/JP2004/004600
§ 371 (c)(1),
(2), (4) Date: Sep. 23, 2005

(87) PCT Pub. No.: WO2004/089993
PCT Pub. Date: Oct. 21, 2004

(65) Prior Publication Data
US 2006/0217484 A1    Sep. 28, 2006

(30) Foreign Application Priority Data

Apr. 9, 2003 (JP) .................................. 2003-105901
May 15, 2003 (JP) .................................. 2003-137931

(51) Int. Cl.
C08D 5/02 (2006.01)
C08F 2/22 (2006.01)
C08F 16/06 (2006.01)

(52) U.S. Cl. ........ 524/556; 524/459; 524/557; 524/503; 524/803; 525/56; 525/59; 525/557

(58) Field of Classification Search .................. 524/459, 524/556, 557, 503, 803; 525/56, 59, 557
See application file for complete search history.

(56) References Cited

U.S. PATENT DOCUMENTS

| | | | |
|---|---|---|---|
| 5,240,771 A | 8/1993 | Brueckmann et al. | |
| 6,451,898 B1 * | 9/2002 | Tanimoto et al. | 524/459 |
| 6,495,623 B1 * | 12/2002 | Tanimoto et al. | 524/459 |
| 6,780,931 B2 | 8/2004 | Tanimoto et al. | |

FOREIGN PATENT DOCUMENTS

| | | |
|---|---|---|
| FR | 2 498 194 | 7/1982 |
| JP | 60-197229 | 10/1985 |
| JP | 4-185606 | 7/1992 |
| JP | 4-185607 | 7/1992 |
| JP | 6-128443 | 5/1994 |
| JP | 7-278212 | 10/1995 |
| JP | 8-245706 | 9/1996 |
| JP | 9-302006 | 11/1997 |
| JP | 10-60055 | 3/1998 |
| JP | 11-335490 | 12/1999 |
| JP | 2000-239473 | 9/2000 |
| JP | 2000-256424 | 9/2000 |
| JP | 2001-323006 | 11/2001 |
| JP | 2002-308939 | 10/2002 |
| JP | 2002308939 A * | 10/2002 |

OTHER PUBLICATIONS

Kim et al. "Poly(vinyl alcohol) Stabilization of Acrylic Emulsion Polymers Using the Miniemulsion Approach", Macromolecules, 2003; 36 (15), p. 5573-5579.*
U.S. Appl. No. 11/994,432, filed Jan. 2, 2008, Nakamae, et al.
U.S. Appl. No. 11/815,219, filed Aug. 1, 2007, Maki, et al.
U.S. Appl. No. 10/653,056, filed Sep. 3, 2003, Tanimoto, et al.
U.S. Appl. No. 12/159,096, filed Jun. 25, 2008, Nakamae.

* cited by examiner

*Primary Examiner* — Michael M Bernshteyn
(74) *Attorney, Agent, or Firm* — Oblon, Spivak, McClelland, Maier & Neustadt, L.L.P.

(57) ABSTRACT

Provided is a (meth)acrylic resin emulsion comprising, as a dispersant, a vinyl alcohol polymer having a degree of saponification of from 80 to 95 mol % and a degree of polymerization of from 400 to 2000 and, as a dispersoid, a polymer comprising at least one type of monomer units selected from acrylate monomer units and methacrylate monomer units, which has a "factor a" of at least 0.3 that indicates the particle size distribution width of the emulsion and of which the film formed at 20° C. to have a thickness of 500 μm has a tensile strength of at least 100 kg/cm$^2$. The emulsion is excellent in all its film strength, film transparency and mechanical stability and further in its alkali resistance.

17 Claims, 1 Drawing Sheet

METHOD FOR PRODUCING A (METH)ACRYLIC RESIN EMULSION

CROSS-REFERENCE TO RELATED APPLICATION

This application is a 371 of PCT/JP04/004600, filed Mar. 31, 2004, and claims priority to Japanese Application Nos. 2003-105901, filed Apr. 9, 2003, and 2003-137931, filed May 15, 2003.

TECHNICAL FIELD

The present invention relates to a (meth)acrylic resin emulsion obtained through emulsion (co)polymerization of a (meth)acrylate monomer in the presence of a vinyl alcohol polymer serving as a dispersant, and to a method for producing it. More precisely, the invention relates to a (meth)acrylic resin emulsion excellent in all its film strength, film transparency and mechanical stability and further in its alkali resistance, and to a method for producing the (meth)acrylic resin emulsion remarkably excellent in its emulsion (co)polymerization stability and polymerization operability.

BACKGROUND ART

Heretofore, emulsions prepared through emulsion polymerization of (meth)acrylate monomers are widely used in various fields of coating materials, paper processing, fiber processing, etc. In emulsion polymerization of these monomers, generally used is an anionic or nonionic surfactant as a stabilizer from the viewpoint of the stability of the emulsion polymerization. However, the emulsion that uses such a surfactant as a stabilizer is defective in that its mechanical stability is poor, and therefore it could not be used in the field that requires high mechanical stability, for example, for admixtures such as cement and mortar.

For the purpose of solving the problem as above, proposed is a method which comprises using polyvinyl alcohol (PVA) having a degree of polymerization of at most 500, preferably at most 300, or comprises emulsion polymerization in the presence of PVA and a chain transfer agent (Patent Reference 1, Patent Reference 2) to thereby improve the mechanical stability of the emulsion. However, using such PVA is still defective in that PVA could not sufficiently exhibit its property as a protective colloid and could not completely satisfy the mechanical stability of the emulsion, and, in addition, the strength of the emulsion film is poor. Also proposed is a method of using a mercapto group-having PVA-type polymer as an emulsion dispersion stabilizer (Patent Reference 3, Patent Reference 4, Patent Reference 5). However, this is problematic in that, when an ordinary initiator such as potassium persulfate, ammonium persulfate or hydrogen peroxide alone, or a redox initiator comprising a combination of such peroxides with various reducing agents is used, then the grafting efficiency on the PVA-type polymer is low and sufficiently practicable stability is difficult to ensure. On the other hand, when an initiator such as potassium bromate capable of generating a radical only through redox reaction with the mercapto group of the PVA-type polymer is used, then the polymerization stability may be improved but the method with it is still problematic in that the reaction reaches deadend at the time when the mercapto group of the PVA-type polymer is exhausted and therefore the polymerization is difficult to control and complete. A method is disclosed for producing an emulsion by adding a polyvinyl alcohol during a stage after the start of polymerization and before the start of aging (Patent Reference 6). However, since the method uses an emulsifier at the start of emulsion polymerization, it is problematic in that, when the emulsion is used in various applications, the emulsifier may migrate to have negative influences on the physical properties of the emulsion products. Further, as is obvious from Comparative Examples 16 and 17 given hereinunder, the emulsion produced according to the method does not contain particles having a sharp particle size distribution of at least 0.3 in terms of the "factor a" as defined herein though its mechanical stability is good, and, in addition, the film strength and the transparency of the emulsion are not satisfactorily good.

Another polymerization method is proposed which comprises continuously or intermittently adding a monomer such as (meth)acrylate monomer or diene monomer and a water-soluble polymer protective colloid to a reactor, and this improves the mechanical stability of the resulting polymer emulsion (Patent Reference 7). However, the method is defective in that the polymerization operability thereof is not good and, in addition, the reproducibility thereof to give emulsion is not also good since the heterogeneous emulsion polymerization is significantly influenced by various factors such as the shape of the stirring blade, the stirring speed and the polymerization scale (the capacity of the polymerization reactor).

Still another polymerization method is proposed which comprises polymerizing an acylate monomer in the presence of PVA in a mode of emulsion dispersion to a particle size of at most 0.5 μm (Patent Reference 8), and this improves the polymerization stability therein. However, the method indispensably requires a forced emulsification device such as homomixer and requires a severe polymerization condition of controlling the oxygen concentration in the aqueous phase during the polymerization to at most 0.3 ppm, and its general use is difficult. Further, as is obvious from Comparative Examples 14 and 15 given hereinunder, the emulsion produced according to the method does not contain particles having a sharp particle size distribution of at least 0.3 in terms of the "factor a" as defined herein though its mechanical stability is good, and, in addition, the film strength and the transparency of the emulsion are not satisfactorily good.

Example 2 of Patent Reference 9 proposes emulsion polymerization that comprises feeding an acrylate (small amount), a peroxide (small amount), PVA and an iron compound into a reactor in the initial stage of polymerization followed by successively adding thereto an acylate (large amount), a peroxide and a reducing agent (Rongalite); Example 3 of Patent Reference 9 proposes emulsion polymerization that comprises feeding an acrylate (total amount), a peroxide (total amount), PVA and an iron compound into a reactor in the initial stage of polymerization followed by successively adding a reducing agent (Rongalite) thereto. PVA used in Patent Reference 9 is a low-polymerization-degree PVA having a molecular weight of from 5000 to 13000 (about 100 to 300 in terms of the degree of polymerization), or a high-saponification-degree PVA having a degree of saponification of at least 96.5 mol %. However, as is obvious from Comparative Examples 10 to 12 and Comparative Examples 18 and 19 given hereinunder, the emulsion produced according to the method proposed in Patent Reference 9 has poor film strength and does not contain particles having a sharp particle size distribution of at least 0.3 in terms of the "factor a" as defined herein, and, in addition, the transparency of the emulsion film is not satisfactorily good.

As described above, various proposals have heretofore been made of (meth)acrylate resin emulsions that comprise PVA-type polymer as a protective colloid. At present, however, no one knows those that completely satisfy the emulsion polymerization stability and the polymerization operability thereof and that are excellent in all the film strength, the film transparency and the mechanical stability thereof and also in the alkali resistance thereof and are therefore applicable to general use.

Patent Reference 1:
    JP-A 4-185606 (claims)
Patent Reference 2:
    JP-A 4-185607 (claims)
Patent Reference 3:
    JP-A 60-197229 (claims)
Patent Reference 4:
    JP-A 6-128443 (claims)
Patent Reference 5:
    JP-A 7-278212 (claims)
Patent Reference 6:
    JP-A 8-245706 (claims, Example 1 and Example 3)
Patent Reference 7:
    JP-A 11-335490 (claims)
Patent Reference 8:
    JP-A 2000-256424 (claims, Example 1 and Example 3)
Patent Reference 9:
    JP-A 10-60055 (claims, Example 2 and Example 3)

DISCLOSURE OF THE INVENTION

Given that situation, the present invention is to provide a (meth)acrylic resin emulsion excellent in all its film strength, film transparency and mechanical stability and further in its alkali resistance, and to provide a method for producing the emulsion remarkably excellent in its emulsion (co)polymerization stability and polymerization operability.

We, the present inventors have found that the above-mentioned object can be attained by providing a (meth)acrylic resin emulsion comprising, as a dispersant, a vinyl alcohol polymer having a degree of saponification of from 80 to 95 mol % and a degree of polymerization of from 400 to 2000 and, as a dispersoid, a polymer comprising at least one type of monomer units selected from acrylate monomer units and methacrylate monomer units, which has a "factor a" of at least 0.3 that indicates the particle size distribution width of the emulsion and of which the film formed at 20° C. and 65% RH to have a thickness of 500 μm has a tensile strength of at least 100 kg/cm$^2$.

BEST MODE FOR CARRYING OUT THE INVENTION

Figure 1:
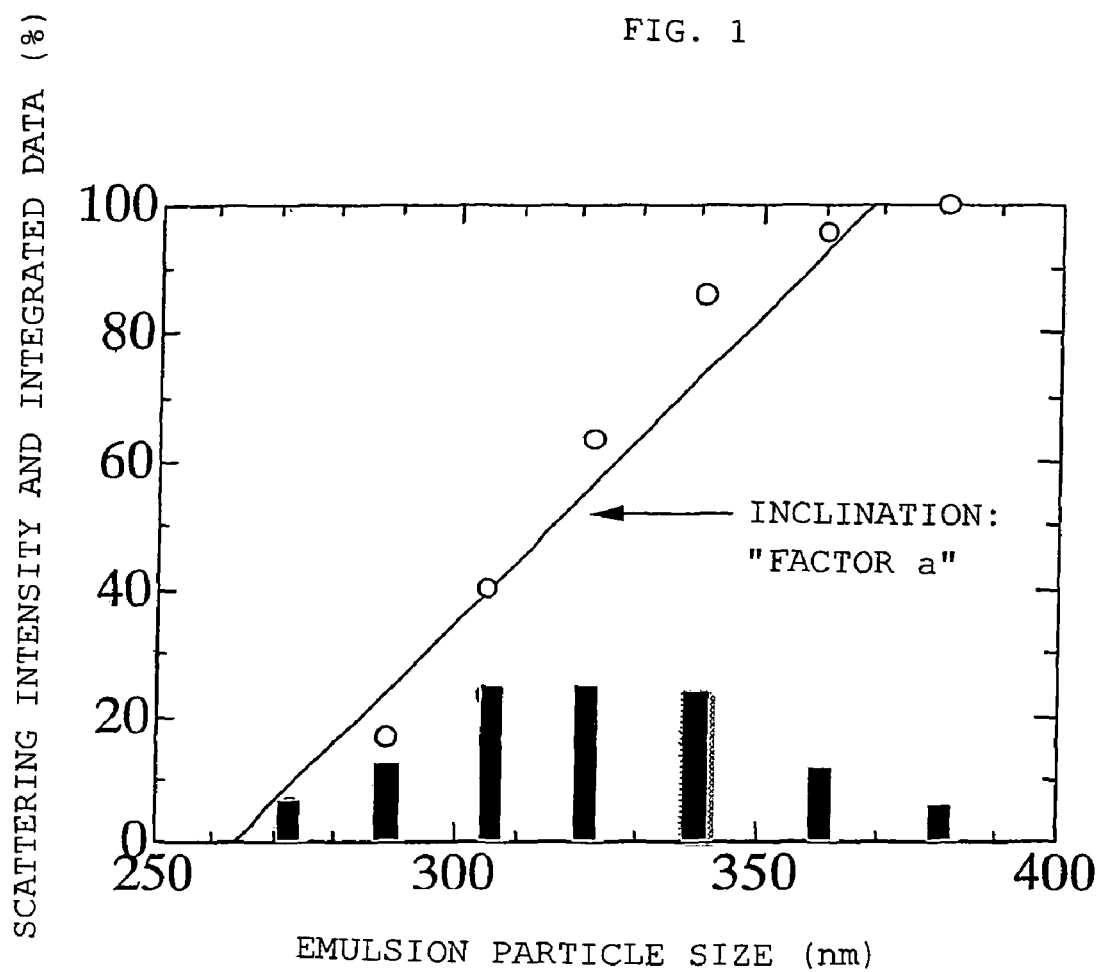
FIG. 1 shows graphs that indicate the data of emulsion particle diameter and scattering intensity measured in a dynamic light scattering method. For the bar graph, the horizontal axis indicates the emulsion particle size, and the vertical axis indicates the emulsion scattering intensity. For the line graph, the horizontal axis indicates the emulsion particle size, and the vertical axis indicates the integrated data of the emulsion scattering intensity.

It is indispensable that the (meth)acrylic resin emulsion of the invention has a "factor a" of at least 0.3 that indicates the particle size distribution width of the emulsion, more preferably having at least 0.5, most preferably at least 0.6. If the "factor a" of the emulsion is less than 0.3, then the particle size distribution width thereof is broad and the film strength and the film transparency of the emulsion therefore lower and, in addition, the mechanical stability thereof also lowers. The mechanical stability of the emulsion indicates the shear stability thereof, meaning that the emulsion produces no or few emulsion particles under shear, especially under high shear.

The "factor a" is calculated from the particle size and the scattering intensity of the emulsion when the particle size distribution of the emulsion is determined according to a dynamic light scattering method. Concretely, the data of emulsion particle size are plotted on an X-axis and the integrated data of the scattering intensity thereof are on an Y-axis, then a linear expression of X and Y is obtained according to a least square method, and a coefficient that indicates the inclination of the resulting linear expression is the "factor a". When the inclination of the linear expression is larger, the particle size distribution width is smaller.

The mean particle size of the (meth)acrylic resin emulsion of the invention is not specifically defined, but in general, it is preferably at most 2 μm measured according to a dynamic light scattering method, more preferably at most 1.5 μm, even more preferably at most 1 μm in point of the film transparency and the film strength of the emulsion. The mean particle size of the emulsion may be determined according to a dynamic light scattering method, for example, by the use of a laser zeta potentiometer, Otsuka Electronics' ELS-8000.

The (meth)acrylic resin emulsion of the invention is obtained, for example, preferably according to the method mentioned below.

A vinyl alcohol polymer (this may be hereinafter abbreviated as PVA) having a degree of saponification of from 80 to 95 mol % and a degree of polymerization of from 400 to 2000 is used as a dispersant. This is important for obtaining the intended (meth)acrylic resin emulsion of the invention that is excellent in the film strength, the film transparency and the mechanical stability of the emulsion and also in the alkali resistance thereof, and is important for providing a method of producing the (meth)acrylic resin emulsion that is excellent in the polymerization operability and the polymerization stability thereof. Not specifically defined in point of its production, the vinyl alcohol polymer may be obtained in any known method of polymerizing a vinyl ester and saponifying the resulting polymer. Including vinyl formate, vinyl acetate, vinyl propionate and vinyl pivalate, the vinyl ester is preferably vinyl acetate.

Using a vinyl alcohol polymer that contains from 1 to 20 mol % of α-olefin units each having at most 4 carbon atoms in the molecule (this may be hereinafter abbreviated as α-olefin-modified PVA) as the PVA-type polymer in the invention is one preferred embodiment of the invention. Using the PVA of the type improves the alkali resistance of the (meth)acrylic resin emulsion. The α-olefin-modified PVA is obtained by saponifying a copolymer of a vinyl ester and an α-olefin having at most 4 carbon atoms. The α-olefin units each having at most 4 carbon atoms include ethylene, propylene, butylene and isobutylene units. Ethylene units are preferred for use herein.

The content of the α-olefin units such as typically ethylene units in the polymer is preferably from 1 to 20 mol %, more preferably at least 1.5 mol %, even more preferably at least 2 mol %. Also preferably, it is at most 15 mol %, even more preferably at most 12 mol %. When the polymer that contains α-olefin units such as typically ethylene units within the range as defined above is used, then the (meth)acrylic resin emulsion produced may have better alkali resistance.

For use in the invention, one preferred embodiment of the vinyl alcohol polymer that contains from 1 to 20 mol % of α-olefin units contains at least (1.7-X/40) mol % of 1,2-glycol bond where the content of the α-olefin units is represented by X mol %. Using the polymer of the type further improves the stability in emulsion polymerization to give the resin emulsion in the invention.

For producing the polymer of the type, for example, employable is a method that comprises copolymerizing vinylene carbonate with a vinyl ester and ethylene in such a controlled manner that the 1,2-glycol bond content of the resulting polymer could fall within the defined range as above, followed by saponifying the resulting polymer; or a method that comprises copolymerizing ethylene and a vinyl ester monomer under pressure and at a polymerization temperature higher than that in ordinary condition, for example, falling between 75 and 200° C., followed by saponifying the resulting polymer. In the latter method, the polymerization temperature is not specifically defined but generally falls between 95 and 190° C., preferably between 100 and 160° C.

In this case, the 1,2-glycol bond content of the polymer is preferably at least (1.7-X/40) mol %, more preferably at least (1.75-X/40) mol %, even more preferably at least (1.8-X/40) mol %, most preferably at least (1.9-X/40) mol %. Also preferably, the 1,2-glycol bond content is at most 4 mol %, more preferably at most 3.5 mol %, most preferably at most 3.2 mol %. The 1,2-glycol bond content of the polymer may be obtained through NMR spectrometry thereof.

Still another preferred embodiment of the invention uses a vinyl alcohol polymer that contains at least 1.9 mol % of 1,2-glycol bond (this may be hereinafter abbreviated as high 1,2-glycol-bond PVA) as the PVA-type polymer. Using the PVA of the type improves the stability in emulsion polymerization to give the resin emulsion in the invention.

Not specifically defined, the high 1,2-glycol-bond PVA may be produced in any known method. For example, it may be produced according to a method that comprises copolymerizing vinylene carbonate with a vinyl ester in such a controlled manner that the 1,2-glycol bond content of the resulting polymer could fall within the range as above, or a method that comprises polymerizing a vinyl ester under pressure at a polymerization temperature higher than that in ordinary condition, for example, falling between 75 and 200° C. In the latter method, the polymerization temperature preferably falls between 95 and 190° C., more preferably between 100 and 180° C. Importantly, the pressure condition is so selected that the polymerization system could be at a temperature not higher than the boiling point thereof under the pressure. Preferably, the pressure is at least 0.2 MPa, more preferably at least 0.3 MPa. Also preferably, the uppermost limit of the pressure is at most 5 MPa, more preferably at most 3 MPa. The polymerization may be effected in any mode of bulk polymerization, solution polymerization, suspension polymerization or emulsion polymerization in the presence of a radical polymerization initiator. For it, preferred is solution polymerization, more preferably with a solvent of methanol. Thus obtained, the vinyl ester polymer is saponified in an ordinary manner to give the intended, high 1,2-glycol-bond vinyl alcohol polymer. Preferably, the 1,2-glycol bond content of the vinyl alcohol polymer is at least 1.9 mol %, more preferably at least 1.95 mol %, even more preferably at least 2.0 mol %, most preferably at least 2.1 mol %. Also preferably, the 1,2-glycol bond content of the polymer is at most 4 mol %, more preferably at most 3.5 mol %, most preferably at most 3.2 mol %. The 1,2-glycol bond content of the polymer may be obtained through NMR spectrometry thereof.

Not interfering with the effect of the invention, the PVA-type polymer may be copolymerized with a copolymerizable ethylenic unsaturated monomer. The ethylenic unsaturated monomer includes, for example, acrylic acid, methacrylic acid, fumaric acid, maleic acid (anhydride), itaconic acid, acrylonitrile, methacrylonitrile, acrylamide, methacrylamide, trimethyl-(3-acrylamido-3-dimethylpropyl)-ammonium chloride, acrylamido-2-methylpropane-sulfonic acid and its sodium salt, ethyl vinyl ether, butyl vinyl ether, vinyl chloride, vinyl bromide, vinyl fluoride, vinylidene chloride, vinylidene fluoride, tetrafluoroethylene, sodium vinylsulfonate, sodium allylsulfonate; and N-vinylamides such as N-vinylpyrrolidone, N-vinylformamide, N-vinylacetamide.

Also employable herein are terminal-modified derivatives that are prepared by polymerizing a vinyl ester monomer such as vinyl acetate in the presence of a thiol compound such as thiolacetic acid or mercaptopropionic acid followed by saponifying the resulting polymer.

Importantly, the degree of polymerization (viscosity-average degree of polymerization) of the PVA-type polymer used as a dispersant in the invention falls between 400 and 2000, more preferably between 400 and 1300. Also importantly, the degree of saponification of the PVA-type polymer falls between 80 and 95 mol %, more preferably between 83 and 93 mol %. Using the PVA-type polymer that satisfies the degree of polymerization and the degree of saponification mentioned above gives the (meth)acrylic resin emulsion excellent in the film strength, the film transparency and the mechanical stability thereof and also in the alkali resistance thereof, and provides the method for producing the (meth)acrylic resin emulsion excellent in the polymerization operability and the polymerization stability thereof, as is obvious from Examples and Comparative Examples given hereinunder.

Though not specifically defined, the amount of the PVA-type polymer to be used as a dispersant may be from 1 to 20 parts by weight, preferably from 2 to 15 parts by weight, more preferably from 2.5 to 10 parts by weight, relative to 100 parts by weight of the monomer to be used for polymerization. If the amount of the PVA-type polymer is smaller than 1 part by weight, then the polymerizations stability may lower; but if larger than 20 parts by weight, then the viscosity of the aqueous emulsion obtained will be too high, and a high-concentration emulsion may be difficult to obtain.

The polymer that constitutes the dispersoid of the (meth)acrylic resin emulsion of the invention is a (co)polymer of at least one monomer selected from acrylate monomers and methacrylate monomers. The monomer includes acrylates such as methyl acrylate, ethyl acrylate, n-propyl acrylate, i-propyl acrylate, n-butyl acrylate, i-butyl acrylate, t-butyl acrylate, 2-ethylhexyl acrylate, dodecyl acrylate, octadecyl acrylate; and methacrylates such as methyl methacrylate, ethyl methacrylate, n-propyl methacrylate, i-propyl methacrylate, n-butyl methacrylate, i-butyl methacrylate, t-butyl methacrylate, 2-ethylhexyl methacrylate, dodecyl methacrylate, octadecyl methacrylate.

Preferably, the polymer to constitute the dispersoid is a (co)polymer of the above-mentioned (meth)acrylate. Not interfering with the effect of the invention, however, it may be copolymerized with any other copolymerizable monomer. Preferably, the proportion of the other monomer is at most 30% by weight, more preferably at most 20% by weight of all the monomers to constitute the copolymer.

The (meth)acrylic resin emulsion of the invention, which has a "factor a" of at least 0.3 indicating the particle size distribution width of the emulsion and of which the film formed at 20° C. and 65% RH to have a thickness of 500 μm has a tensile strength of at least 100 kg/cm$^2$, can be obtained favorably according to the method mentioned below.

Specifically, the emulsion of the invention is obtained through emulsion (co)polymerization of at least one monomer selected from acrylate monomers and methacrylate monomers, using, as a dispersant, a vinyl alcohol polymer having a degree of saponification of from 80 to 95 mol % and a degree of polymerization of from 400 to 2000 and using a redox-type polymerization initiator comprising a peroxide and a reducing agent, and the emulsion (co)polymerization is effected in such a controlled manner that (1) an iron compound, (2) the monomer and (3) the vinyl alcohol polymer are fed into the reactor in the initial stage of the reaction and the peroxide is continuously or intermittently added to the polymerization system.

According to the production method of the invention, it is desirable that an iron compound, especially all of it is added to the reactor in the initial stage of polymerization for ensuring better emulsion polymerization operability and better emulsion stability in the method and for obtaining the aqueous emulsion of the invention which has a "factor a" of at least 0.3 and of which gives a film having a tensile strength of at least 100 kg/cm$^2$. Though not specifically defined, the iron compound is preferably at least one selected from ferrous chloride, ferrous sulfate, ferric chloride, ferric nitrate and ferric sulfate. Of those, especially preferred are ferrous chloride and ferrous sulfate.

Through not specifically defined, the amount of the iron compound to be used herein may be generally from 1 to 50 ppm, more preferably from 5 to 30 ppm of all the monomer to be used. When the amount of the iron compound used falls within the range, then the polymerization operability is good.

In the production method of the invention, a redox-type polymerization initiator that comprises a peroxide and a reducing agent is used. Though not specifically defined, the peroxide is preferably any of hydrogen peroxide, ammonium persulfate, potassium persulfate and t-butyl hydroperoxide. More preferred is hydrogen peroxide. It is necessary that the peroxide is continuously or intermittently added to the polymerization system. Continuously or intermittently adding it to the system betters the polymerization operability and the polymerization stability and gives the emulsion of the invention having better properties.

When the peroxide for use herein is hydrogen peroxide, then it is preferably 0.1 to 5 wt. % hydrogen peroxide, more preferably aqueous 0.2 to 3 wt. % hydrogen peroxide, even more preferably aqueous 0.25 to 2 wt. % hydrogen peroxide for improving the polymerization operability. When from 0.01 to 1 part by weight of hydrogen peroxide, in terms of the pure content thereof, is used relative to 100 parts by weight of the monomer, then it betters the polymerization operability and the polymerization stability and gives the emulsion of the invention having better properties.

When the peroxide for use herein is hydrogen peroxide, the reducing agent is preferably any of tartaric acid, L-ascorbic acid, Rongalite or their metal salts. When the peroxide is ammonium persulfate or potassium persulfate, the reducing agent is preferably sodium hydrogensulfite or sodium hydrogencarbonate. The method of adding the reducing agent to the system is not specifically defined. It may be added successively to the system, or may be added thereto all at a time in the initial stage of polymerization. Preferably, at least 70% by weight, more preferably at least 80% by weight, even more preferably at least 90% by weight, most preferably substantially 100% by weight of all the reducing agent is added to the system in the initial stage of polymerization in view of the polymerization operability.

Though not specifically defined, the amount of the reducing agent may be generally from 0.05 to 3 equivalents, preferably from 0.1 to 2 equivalents, more preferably from 0.3 to 1.5 equivalents relative to the polymerization initiator (peroxide).

For the reducing agent, preferred are tartaric acid compounds. Precisely, they include tartaric acid and/or its metal salts. Tartaric acid includes dextro-rotatory L(+)-tartaric acid, levo-rotatory D(−)-tartaric acid, and a racemate of these antipodes, DL-tartaric acid. Though not specifically defined, L(+)-tartaric acid of those is preferred for noticeably bettering the polymerization operability. Metal salts of tartaric acid may also be used, and the type of the metal for them is not specifically defined. Sodium tartrate is preferred. Above all, L(+)-sodium tartrate is more preferred. When L(+)-sodium tartrate is used, the polymerization operability is the best.

In the production method of the invention, it is important that not only the iron compound but also the monomer and the PVA-type polymer are fed into the reactor in the initial stage of polymerization. In particular, it is desirable that at least 70% by weight, more preferably at least 80% by weight, even more preferably at least 90% by weight, most preferably substantially 100% by weight of these are fed into the reactor in the initial stage of polymerization. The method betters not only the polymerization operability but also noticeably the emulsion polymerization stability, and gives the intended (meth)acrylic resin emulsion of the invention having better properties. The initial stage of polymerization as referred to herein means just before the start of polymerization or just after the start thereof.

In the production method of the invention, it is desirable that a chain transfer is not substantially used for making the proportion of the graft polymer (the dispersant and the dispersoid are chemically bonded to give it, and its content is measured according to the method to be mentioned hereinunder) in the resulting emulsion at least 50% by weight and for improving the solvent resistance of the emulsion. Preferably, the graft polymer content of the emulsion is at least 55% by weight, more preferably at least 60% by weight, most preferably at least 65% by weight.

For improving the polymerization stability in the invention, a chain transfer agent may be added, if desired, to the system in the initial stage of polymerization. Not specifically defined, the chain transfer agent may be any compound that causes chain transfer during emulsion polymerization. For example, it includes alcohols such as methanol, ethanol, n-propanol, i-propanol, n-butanol, i-butanol; ketones such as acetone, methyl ethyl ketone, cyclohexanone, acetophenone; aldehydes such as acetaldehyde, propionaldehyde, n-butylaldehyde, furfural, benzaldehyde; and mercaptans such as 2-mercaptoethanol, 3-mercaptopropionic acid, n-dodecylmercaptan, t-dodecylmercaptan, laurylmercaptan, n-butylmercaptan, t-butylmercaptan, 2-ethylhexyl thioglycolate, octyl thioglycolate. Of those, preferred are mercaptan-type chain transfer agents. Not specifically defined, the amount of the chain transfer agent to be added may be from 0.01 to 50 parts by weight, preferably from 0.1 to 30 parts by weight relative to 100 parts by weight of all the monomer.

In the invention, it is desirable that the polymerization is effected not using any nonionic or anionic surfactant heretofore used in the art, for improving the polymerization stability and for increasing the proportion of the graft polymer to improve the solvent resistance of the emulsion.

Though not specifically defined, the solid concentration of the emulsion of the invention may be generally from 20 to 70% by weight, preferably from 30 to 65% by weight, more preferably from 40 to 60% by weight. If the solid concentration thereof is smaller than 20% by weight, then the storage stability of the emulsion may lower and the emulsion may separate into two phases; but if larger than 70% by weight, then the polymerization stability may lower.

Importantly, the film of the (meth)acrylic resin emulsion of the invention formed at 20° C. and 65% RH to have a thickness of 500 μm has a tensile strength (the method of measuring it is described hereinunder) of at least 100 kg/cm². Preferably, the tensile strength is at least 110 kg/cm², most preferably at least 120 kg/cm². Though not specifically defined, the uppermost limit of the tensile strength may be at most 300 kg/cm², preferably at most 200 kg/cm². When the tensile strength of the film thereof falls within the range as above, then the (meth)acrylic resin emulsion may have good properties (in point of the film strength, and the bonding strength and the adhesion strength of the emulsion).

Preferably, the filtration residue of the (meth)acrylic resin emulsion of the invention, which is, after tested with a Maron-type mechanical stability tester at 20° C. (atmospheric temperature and initial-stage emulsion temperature) under a load of 0.5 kg/cm² at 1500 rpm for 10 minutes, filtered through a 60-mesh stainless steel sieve (ASTM standard sieve), is at most 0.5% by weight, more preferably at most 0.3% by weight, even more preferably at most 0.2% by weight, most preferably at most 0.1% by weight. When the filtration residue thereof falls within the range as above, then it may be said that the emulsion has good mechanical stability. The emulsion of the type may be favorably obtained according to the method mentioned above.

Preferably, the dissolution of the film of the (meth)acrylic resin emulsion of the invention, formed at 20° C. and 65% RH to have a thickness of 500 μm on a polyethylene terephthalate (PET) film and dipped in an aqueous 1 N sodium hydroxide solution at 20° C. for 24 hours, is at most 10%, more preferably at most 8%, even more preferably at most 7%. Also preferably, the degree of swelling of the film is at most 30%, more preferably at most 25%, even more preferably at most 20%. When the dissolution and the degree of swelling of the film thereof fall within the ranges as above, then it may be said that the emulsion may form films having good alkali resistance. Methods of determining the dissolution and the degree of swelling will be described hereinunder.

The emulsion obtained according to the method mentioned above may be used directly as it is, but if desired, it may be combined with any known emulsion not interfering with the effect of the invention. In addition, any known additive may be added to the emulsion of the invention. Examples of the additives are organic solvents (aromatic solvents such as toluene, xylene; alcohols, ketones, esters, halogen-containing solvents), plasticizer, suspension stabilizer, tackifier, flowability improver, preservative, rust-proofing agent, defoaming agent, filler, moisturizer, colorant.

The emulsion obtained according to the production method of the invention has good film strength, film transparency and mechanical stability and has good alkali resistance, and it is favorably used in the field of paints, additives to hydraulic substances, joint materials, various types of adhesives, binders for paper and nonwoven fabric products, paper processing and fiber processing materials, coating agents, etc.

When the aqueous emulsion of the invention is dried, especially spray-dried, then it gives a synthetic resin powder that is resistant to blocking and redisperses in water. The aqueous emulsion prepared by redispersing the powder in water also has good film strength, alkali resistance and film transparency like the original aqueous emulsion. Spray-drying the emulsion may be effected in any ordinary manner of spraying and drying a liquid. Regarding the spraying mode for it, the emulsion may be sprayed with any of discs, nozzles or shock waves. For the heat. source, employable is any of hot air or hot steam. The drying condition may be suitably determined depending on the size and the type of the spraying drier used, and on the concentration, the viscosity and the flow rate of the synthetic resin emulsion to be spray-dried. The drying temperature range suitably falls between 100° C. and 150° C., within which it is desirable that the other drying conditions are determined so as to obtain well dried powder.

For improving the storage stability and the redispersibility in water of the synthetic resin emulsion powder, it is desirable to add inorganic powder (antiblocking agent) to it. The inorganic powder may be added to the spray-dried emulsion powder and uniformly mixed with it. However, it is desirable that the synthetic resin emulsion is sprayed in the presence of an inorganic powder (simultaneous spraying of emulsion along with inorganic powder) for more uniformly mixing them. Preferably, the inorganic powder is a fine powder having a mean particle size of from 0.1 to 100 μm. For the inorganic powder, preferred is a powder of fine particles, for which, for example, usable are calcium carbonate, clay, silicic anhydride, aluminium silicate, white carbon, talc, and alumina white. Of those inorganic powders, more preferred is silicic anhydride. The amount of the inorganic powder is preferably at most 20% by weight, more preferably at most 10% by weight of the emulsion powder to which it is added. This is because, if the amount is too large, then it may worsen the properties of the synthetic resin emulsion. The lowermost limit of the amount of the inorganic powder is preferably at least 0.1% by weight, more preferably at least 0.2% by weight. Organic fillers may also be used for the powder.

For further improving the redispersibility in water of the synthetic resin emulsion powder, various water-soluble additives may be added to the powder. Preferably, the water-soluble additive is added to the synthetic resin emulsion before the emulsion is spray-dried, and then the resulting mixture is spray-dried, as it may be uniformly mixed with the resulting emulsion powder. The amount of the water-soluble additive to be added is not specifically defined and may be suitably so controlled that it does not have any negative influence on the physical properties such as water resistance of the emulsion. The additives include polyvinyl alcohol, hydroxyethyl cellulose, methyl cellulose, starch derivatives, polyvinylpyrrolidone, polyethylene oxide, as well as water-soluble alkyd resins, water-soluble phenolic resins, water-soluble urea resins, water-soluble melamine resins, water-soluble naphthalenesulfonic acid resins, water-soluble amino resins, water-soluble polyamide resins, water-soluble acrylic resins, water-soluble polycarboxylic acid resins, water-soluble polyester resins, water-soluble polyurethane resins, water-soluble polyol resins, water-soluble epoxy resins.

The synthetic resin emulsion powder (having a mean particle size of from 1 to 1000 μm, preferably from 2 to 500 μm) may be directly used for various applications as it is, but if desired, it may be combined with any other conventional known emulsion or emulsion powder not interfering with the effect of the invention.

The synthetic resin emulsion powder is especially useful for additives to hydraulic substances or for joint materials for hydraulic substances. The hydraulic substances as referred to herein include, for example, hydraulic cement such as Portland cement, alumina cement, slag cement, fly ash cement; and other hydraulic materials than cement, such as gypsum and plaster.

In case where the additive to such hydraulic substances is added, for example, to cement mortar that comprises cement, aggregate and water, its amount is preferably from 5 to 20% by weight of cement. The aggregate may be any of fine aggregate such as river sand, ground sand, color sand and siliceous sand; and coarse aggregate such as river gravel and ground stones.

In case where the synthetic resin emulsion powder is used for a joint material for hydraulic substances, the powder is suitably re-emulsified in water and applied onto a hydraulic substance substrate of concrete or the like to be a joint material (primer-processing agent) for it, and then a hydraulic substance such as cement mortar is stuck onto it. Using the joint material of the type ensures good adhesiveness and good durability and even good mechanical strength of the bonded articles.

For further improving the dispersibility of the additives or joint materials for hydraulic substances, various additives may be added to them. Preferably, water-soluble additives are added to the synthetic resin emulsion before the emulsion is spray-dried, and then the resulting mixture is spray-dried, as the process gives uniform mixtures. The amount of the water-soluble additive is not specifically defined. For the additive, referred to are the water-soluble additives mentioned hereinabove.

In case where the synthetic resin emulsion powder is used for additives or joint materials for hydraulic substances, any of AE agent, water-reducing agent, fluidizing agent, water-retaining agent, thickener, water resistant agent, defoaming agent and the like may be suitably added thereto.

The synthetic resin emulsion powder may also be used for adhesives, coating compositions, paper processing agents and others. For those applications, the emulsion powder may contain any of additive for adjusting fluidity, water-retaining agent, tackifier, thickener, pigment dispersant, stabilizer, etc.

The invention is described concretely with reference to the following Examples, which, however, are not intended to restrict the scope of the invention. In the Examples, "part" and "%" are all by weight.

EXAMPLE 1

750 g of ion-exchanged water and 40 g of PVA-1 (Kuraray's PVA-205 having a degree of polymerization of 500 and a degree of saponification of 88 mol %) were fed into a 2-liter polymerization reactor of glass equipped with a reflux condenser, a thermometer, a nitrogen-introducing duct and an anchor-shaped stirrer, and completely dissolved at 95° C. After cooled to 60° C., 266 g of methyl methacrylate (MMA) and 266 g of butyl acrylate (n-butyl acrylate) (BA) were added to it, and then purged with nitrogen with stirring at 120 rpm. Next, 0.0058 g of ferrous chloride, and 25 g of aqueous 10% sodium L(+)-tartrate (TAS) solution were added to it. Next, 100 g of aqueous 0.5% hydrogen peroxide (HPO) solution was added thereto, taking 3 hours, and this was polymerized in a mode of emulsion polymerization. 5 minutes after the start of adding hydrogen peroxide, the system generated heat, and this confirmed the initiation of the emulsion polymerization. With that, the polymerization was continued while the outer temperature around the system was kept to fall between 50 and 55° C., and the polymerization temperature fell between 58 and 62° C. and the polymerization operability was good. After the aqueous hydrogen peroxide solution was completely added, the system was kept for 1 hour until the polymerization was finished, and then the system was cooled. As a result, an emulsion having a solid concentration of 39.8% was obtained.

The graft polymer proportion (determined according to the method mentioned below) of the emulsion was 74.3% by weight. The solvent resistance (in terms of the dissolution determined according to the method mentioned below) of the emulsion was 20% (to toluene), 23% (to acetone) and 18% (to ethyl acetate). For the other properties thereof, the emulsion was evaluated according to the methods mentioned below. The results are given in Table 1.

(Emulsion Evaluation)

(1) Polymerization Operability:

After the start of the polymerization, the polymerization temperature profile is traced to monitor the temperature increase owing to the polymerization heat. This indicates the easiness in controlling the polymerization. When the polymerization temperature profile is narrower, then it means that the polymerization control is easier.

(2) Polymerization Stability:

The emulsion is filtered through a 60-mesh stainless steel sieve (ASTM standard sieve). The filtration residue on the sieve is collected, and its weight is measured. The residue per kg of the emulsion (solid content) is shown in Table 1.

(3) Film Strength:

The emulsion is cast onto a polyethylene terephthalate (PET) film at 20° C. and 65% RH, and dried for 7 days to form thereon a film having a thickness of 500 μm. The film thus formed is conditioned at 20° C. and 60% RH for 1 week, and its tensile strength (pulling rate, 5 cm/min; chuck-to-chuck distance, 50 mm) is measured.

(4) Alkali Resistance:

The emulsion is cast onto a polyethylene terephthalate (PET) film at 20° C. and 65% RH, and dried for 7 days to form thereon a dry film having a thickness of 500 μm. The film is blanked to give a circular sample having a diameter of 2.5 cm, and the sample is dipped in aqueous 1 N sodium hydroxide solution at 20° C. for 24 hours. The film dissolution and the film swelling degree are determined.

Dissolution (%):
{1−(absolute dry weight of film after dipping/absolute dry weight of film before dipping)}×100.

Degree of Swelling (%):
{(weight of water-absorbed film after dipping/absolute dry weight of film before dipping)−1}×100.

*Absolute Dry Weight of Film before dipping:
film weight (hydrous) before dipping−{film weight (hydrous) before dipping×water content of film (%)/100}.

*Water Content of Film:
A film (this sample differs from the sample to be dipped in aqueous 1 N sodium hydroxide solution at 20° C.) is absolutely dried at 105° C. for 4 hours, and the water content of the film is previously determined.

*Absolute Dry Weight of Film after Dipping:
After dipped, the film is absolutely dried at 105° C. for 4 hours, and its weight is determined.

*Weight of Water-Absorbed Film after Dipping:
After dipped, the film is pulled up from aqueous 1 N sodium hydroxide solution, and the solution having adhered to the film is wiped away with gauze, and the film is then weighed.

(5) Mechanical Stability:

The emulsion is tested with a Maron-type mechanical stability tester at 20° C. under a load of 0.5 kg/cm$^2$ at 1500 rpm for 10 minutes, and filtered through a 60-mesh stainless steel sieve (ASTM standard sieve), and the proportion (%) of the filtration residue to the solid weight of the aqueous emulsion is determined. The sample that leaves a smaller filtration residue has better mechanical stability.

The solid concentration and the filtration residue weight are determined as follows:

Method of Measuring Solid Concentration:

About 3 g of the emulsion is put on an aluminium dish, and its weight is accurately measured. This is dried in a drier at 105° C. for 24 hours to remove water from it. Then, the weight of the dried sample is measured, and the solid concentration of the sample is calculated from the weight ratio.

Method of Measuring Filtration Residue Weight:

The filtration residue is dried in a drier at 105° C. for 24 hours to remove water from it. Then, the weight of the dried sample is measured, and this is the filtration residue weight.

(6) Film Transparency:

The emulsion was cast at 20° C. to form a film having a thickness of 500 μm, and the film transparency was evaluated. Regarding the evaluation result, "O" indicates that the film is almost transparent; "Δ" indicates that the film is relatively cloudy; and "x" indicates that the film is completely cloudy.

(7) Particle Size Distribution of Emulsion (Factor a):

The emulsion is diluted to a concentration of 0.05%, and analyzed according to a dynamic light scattering method to determine the mean particle size and the scattering intensity of the sample (Otsuka Electronics' Laser Zeta Potentiometer, ELS-8000). From the thus-obtained data of scattering intensity, the factor a that indicates the particle size distribution latitude is derived according to the method described hereinabove.

(8) Graft Polymer Proportion (wt. %):

The emulsion is cast onto a polyethylene terephthalate (PET) film at 20° C. and 65% RH, and dried for 7 days to form thereon a dry film having a thickness of 500 μm. The film is blanked to give a circular sample having a diameter of 2.5 cm, and the sample is subjected to Soxhlet extraction in acetone for 24 hours and then to extraction in boiling water for 24 hours. Thus extracted, the insoluble content (graft polymer content) of the film is obtained.

Graft Polymer Content (%)
=(absolute dry weight of film after extraction/absolute dry weight of film before extraction)×100.

Absolute Dry Weight of Film Before Extraction
=film weight (hydrous) before extraction−{film weight (hydrous) before extraction×water content of film (%)/100}.

*Water Content of Film:
A film (this sample differs from the sample to be extracted in acetone and in boiling water) is absolutely dried at 105° C. for 4 hours, and the water content of the film is previously determined.

*Absolute Dry Weight of Film after Extraction:
After extracted, the film is absolutely dried at 105° C. for 4 hours, and its weight is determined.

(9) Solvent Resistance (Dissolution):

The emulsion is cast onto a polyethylene terephthalate (PET) film at 20° C. and 65% RH, and dried for 7 days to form thereon a dry film having a thickness of 500 μm. The film is blanked to give a circular sample having a diameter of 2.5 cm, and the sample is dipped in three solvents (toluene, acetone, ethyl acetate) at 20° C. for 24 hours. The film dissolution in each solvent is obtained.

Dissolution (%):
{1−(absolute dry weight of film after dipping/absolute dry weight of film before dipping)]×100.

*Absolute Dry Weight of Film Before Dipping:
film weight (hydrous) before dipping−{film weight (hydrous) before dipping×water content of film (%)/100}.

*Water Content of Film:
A film (this sample differs from the sample to be dipped in solvent at 20° C.) is absolutely dried at 105° C. for 4 hours, and the water content of the film is previously determined.

*Absolute Dry Weight of Film after Dipping:
After dipped, the film is absolutely dried at 105° C. for 4 hours, and its weight is determined.

COMPARATIVE EXAMPLE 1

750 g of ion-exchanged water and 40 g of PVA-1 were fed into a 2-liter polymerization reactor of glass equipped with a reflux condenser, a dropping funnel, a thermometer, a nitrogen-introducing duct and an anchor-shaped stirrer, and completely dissolved at 95° C. This was purged with nitrogen, and controlled at 60° C. with stirring at 120 rpm. Next, 0.0058 g of ferrous chloride, and 25 g of aqueous 10% sodium L(+)-tartrate (TAS) solution were added to it. Next, a mixture of 266 g of methyl methacrylate and 266 g of butyl acrylate was continuously added to it through the dropping funnel, taking a targeted time of 2 hours, and in addition, 100 g of aqueous 0.5% hydrogen peroxide solution was also continuously added to it, taking a targeted time of 3 hours. The polymerization was continued while the external temperature around the system was kept at 55° C., but after 1 hour, the polymerization system gelled, and the test was stopped.

COMPARATIVE EXAMPLE 2

Aqueous hydrogen peroxide solution was added to the same system as in Example 1 under the same condition as therein, except that ferrous chloride was not used. 15 minutes after the start of adding hydrogen peroxide, the system generated heat and its emulsion polymerization started. In this stage, the external temperature around the system was controlled at 50° C., and adding hydrogen peroxide was continued. Since the polymerization temperature reached 65° C., adding hydrogen peroxide was stopped. However, the heat generation did not stop, and the polymerization temperature reached 70° C. Therefore, since the polymerization control would be impossible, the test was stopped.

EXAMPLE 2

The same process of emulsion polymerization as in Example 1 was carried out, except that 2.6 g of n-dodecylmercaptan was fed into the system at the initial stage of polymerization. Thus obtained, the aqueous emulsion was evaluated, and its results are given in Table 1.

COMPARATIVE EXAMPLE 3

The same process of emulsion polymerization as in Comparative Example 1 was tried, except that 2.6 g of n-dodecylmercaptan was fed into the system at the initial stage of polymerization. However, one hour and 30 minutes after the start of polymerization, the polymerization system gelled, and the test was stopped.

COMPARATIVE EXAMPLE 4

The same process of emulsion polymerization as in Comparative Example 2 was tried, except that 2.6 g of n-dodecylmercaptan was fed into the system at the initial stage of polymerization. However, like in Comparative Example 2, the heat generation could not be controlled, and the test was stopped.

EXAMPLE 3

The same process of emulsion polymerization as in Example 2 was carried out, except that PVA-2 (Kuraray's PVA-210 having a degree of polymerization of 1000 and a degree of saponification of 88 mol %) was used in place of PVA-1. Thus obtained, the aqueous emulsion was evaluated, and its results are given in Table 1.

COMPARATIVE EXAMPLE 5

The same process of emulsion polymerization as in Comparative Example 3 was tried, except that PVA-2 was used in place of PVA-1. However, one hour and 40 minutes after the start of polymerization, the polymerization system gelled, and the test was stopped.

EXAMPLE 4

The same process of emulsion polymerization as in Example 2 was carried out, except that PVA-3 (having a degree of polymerization of 500 and a degree of saponification of 80 mol %) was used in place of PVA-1. Thus obtained, the aqueous emulsion was evaluated, and its results are given in Table 1.

EXAMPLE 5

The same process of emulsion polymerization as in Example 2 was carried out, except that PVA-4 (having a degree of polymerization of 500 and a degree of saponification of 93 mol %) was used in place of PVA-1. Thus obtained, the aqueous emulsion was evaluated, and its results are given in Table 1.

EXAMPLE 6

750 g of ion-exchanged water and 40 g of PVA-1 were fed into a 2-liter polymerization reactor of glass equipped with a reflux condenser, a thermometer, a nitrogen-introducing duct and an anchor-shaped stirrer, and completely dissolved at 95° C. After cooled to 60° C., 266 g of methyl methacrylate and 266 g of butyl acrylate were added to it, and then purged with nitrogen with stirring at 120 rpm. Next, 0.0058 g of ferrous chloride, and 10 g of sodium hydrogensulfite (SHS) solution were added to it. Next, 50 g of aqueous potassium persulfate (KPS) solution was added thereto, taking 3 hours, and this was polymerized in a mode of emulsion polymerization. 10 minutes after the start of adding potassium persulfate, the system generated heat, and this confirmed the initiation of the emulsion polymerization. With that, the polymerization was continued while the outer temperature around the system was kept to fall between 50 and 55° C., and the polymerization temperature fell between 56 and 65° C. After the aqueous potassium persulfate solution was completely added, the system was kept for 1 hour until the polymerization was finished, and then the system was cooled. As a result, an emulsion having a solid concentration of 39.7% was obtained. The graft polymer proportion of the emulsion was 65% by weight. The solvent resistance of the emulsion was 27% (to toluene), 28% (to acetone) and 24% (to ethyl acetate).

The aqueous emulsion was evaluated, and its results are given in Table 1.

EXAMPLE 7

750 g of ion-exchanged water and 40 g of PVA-1 were fed into a 2-liter polymerization reactor of glass equipped with a reflux condenser, a thermometer, a nitrogen-introducing duct and an anchor-shaped stirrer, and completely dissolved at 95° C. After cooled to 60° C., 399 g of methyl methacrylate, 133 g of butyl acrylate and 2.6 g of n-dodecylmercaptan were added to it, and then purged with nitrogen with stirring at 120 rpm. Next, 0.0058 g of ferrous chloride, and 25 g of aqueous 10% sodium L(+)-tartrate solution were added to it. Next, 100 g of aqueous 0.5% hydrogen peroxide solution was added thereto, taking 3 hours, and this was polymerized in a mode of emulsion polymerization. 5 minutes after the start of adding hydrogen peroxide, the system generated heat, and this confirmed the initiation of the emulsion polymerization. With that, the polymerization was continued while the outer temperature around the system was kept to fall between 50 and 55° C., and the polymerization temperature fell between 58 and 62° C. and the polymerization operability was good. After the aqueous hydrogen peroxide solution was completely added, the system was kept for 1 hour until the polymerization was finished, and then the system was cooled. As a result, an emulsion having a solid concentration of 39.8% was obtained. The aqueous emulsion was evaluated, and its results are given in Table 1.

COMPARATIVE EXAMPLE 6

750 g of ion-exchanged water, 40 g of PVA-5 (having a degree of polymerization of 500 and a degree of saponification of 88 mol %, and terminated with a mercapto group to a degree of $1.5 \times 10^{-5}$ equivalent/g) and 2.6 g of n-dodecylmercaptan were fed into a 2-liter polymerization reactor of glass equipped with a reflux condenser, a dropping funnel, a thermometer, a nitrogen-introducing duct and an anchor-shaped stirrer, and completely dissolved at 95° C. This was purged with nitrogen and controlled at 60° C. with stirring at 120 rpm. Next, 0.0058 g of ferrous chloride, and 25 g of aqueous 10% sodium L(+)-tartrate solution were added to it. Next, a mixture of 399 g of methyl methacrylate and 133 g of butyl acrylate was continuously added to it through the dropping funnel, taking 2 hours, and in addition, 100 g of aqueous 0.5% hydrogen peroxide solution was also continuously added to it, taking 3 hours. After the addition, the system was kept for 1 hour and then cooled. However, the system gelled, and the test was stopped.

EXAMPLE 8

750 g of ion-exchanged water and 40 g of PVA-1 were fed into a 2-liter polymerization reactor of glass equipped with a reflux condenser, a thermometer, a nitrogen-introducing duct and an anchor-shaped stirrer, and completely dissolved at 95° C. After cooled to 60° C., 133 g of methyl methacrylate, 399 g of butyl acrylate and 2.6 g of n-dodecylmercaptan were added to it, and then purged with nitrogen with stirring at 120 rpm. Next, 0.0058 g of ferrous chloride, and 25 g of aqueous 10% sodium L(+)-tartrate solution were added to it. Next, 100 g of aqueous 0.5% hydrogen peroxide solution was added thereto, taking 3 hours, and this was polymerized in a mode of emulsion polymerization. 5 minutes after the start of adding hydrogen peroxide, the system generated heat, and this confirmed the initiation of the emulsion polymerization. With that, the polymerization was continued while the outer temperature around the system was kept to fall between 50 and 55° C., and the polymerization temperature fell between 58 and 62° C. and the polymerization operability was good. After the aqueous hydrogen peroxide solution was completely added, the system was kept for 1 hour until the polymerization was finished, and then the system was cooled. As a result, an emulsion having a solid concentration of 39.7% was obtained. The emulsion was evaluated, and its results are given in Table 1.

EXAMPLE 9

The same process of emulsion polymerization as in Example 2 was carried out, except that a 3-stage paddle-shaped stirrer was used in place of the anchor-shaped stirrer, and an emulsion was obtained stably. Thus obtained, the emulsion was evaluated, and its results are given in Table 1.

COMPARATIVE EXAMPLE 7 (ACCORDING TO THE METHOD DESCRIBED IN JP-A 11-335490)

40 g of PVA-1 was added to 400 g of ion-exchanged water, and dissolved therein under heat at 95° C. The resulting aqueous solution was cooled to 20° C., and a monomer mixture of 266 g of methyl methacrylate and 266 g of butyl acrylate was added to it and mixed with stirring to give a monomer emulsion. Apart from it, 350 g of ion-exchanged water and 10 g of ethanol were fed into a 2-liter polymerization reactor of glass equipped with a reflux condenser, a dropping funnel, a thermometer, a nitrogen-introducing duct and a 3-stage paddle-shaped stirrer, and heated up to 80° C. Kept at 80° C., an initiator solution prepared by dissolving 0.5 g of ammonium persulfate in 10 g of ion-exchanged water was added to it. After 2 minutes, adding the monomer emulsion to the polymerization reactor was started, and the addition was completed in 4 hours. After the addition, the system was stirred for 2 hours, and then cooled to obtain an emulsion. The emulsion was evaluated, and its results are given in Table 1.

COMPARATIVE EXAMPLE 8 (ACCORDING TO THE METHOD DESCRIBED IN JP-A 4-185606)

In a 2-liter polymerization reactor equipped with a thermometer, an anchor-shaped stirrer, a reflux condenser, a nitrogen-introducing duct and a dropping funnel, 80 g of PVA-6 (having a degree of polymerization of 100 and a degree of saponification of 88 mol %) was added to 680 g of ion-exchanged water, and dissolved therein under heat at 95° C. with stirring. Then, this was cooled to 70° C. and purged with nitrogen. In a different reactor, 200 g of methyl methacrylate, 200 g of butyl acrylate and 6 g of acrylic acid were mixed, and purged with nitrogen. 10 g of aqueous 0.5% potassium persulfate solution and 40 g of the monomer mixture were added to the polymerization reactor, and subjected to initial polymerization. Then, the remaining monomer mixture was dropwise added to the system, taking 3 hours. During this, 15 g of aqueous 0.5% potassium persulfate solution was also continuously added to the system. After the addition, the system was kept for 1 hour, and then cooled and controlled to have a pH of 7.5 with aqueous 10% ammonia added thereto. Thus obtained, the emulsion was evaluated, and its results are given in Table 1.

EXAMPLE 10

The same process of emulsion polymerization as in Example 2 was carried out, except that PVA-7 (having an ethylene unit content of 3 mol %, a degree of polymerization of 500 and a degree of saponification of 93 mol %) was used in place of PVA-1. Thus obtained, the aqueous emulsion was evaluated, and its results are given in Table 1.

EXAMPLE 11

The same process of emulsion polymerization as in Example 2 was carried out, except that PVA-8 (having a 1,2-glycol bond content of 2.5 mol %, a degree of polymerization of 500 and a degree of saponification of 88 mol %) was used in place of PVA-1. Thus obtained, the aqueous emulsion was evaluated, and its results are given in Table 1.

EXAMPLE 12

The same process of emulsion polymerization as in Example 2 was carried out, except that PVA-9 (having an ethylene unit content of 2 mol %, a 1,2-glycol bond content of 2.2 mol %, a degree of polymerization of 500 and a degree of saponification of 88 mol %) was used in place of PVA-1. Thus obtained, the aqueous emulsion was evaluated, and its results are given in Table 1.

COMPARATIVE EXAMPLE 9

750 g of ion-exchanged water and 40 g of PVA-1 were fed into a 2-liter polymerization reactor of glass equipped with a reflux condenser, a thermometer, a nitrogen-introducing duct and an anchor-shaped stirrer, and completely dissolved at 95° C. After cooled to 60° C., 532 g of vinyl acetate was added to it, and then purged with nitrogen with stirring at 120 rpm. Next, 0.0058 g of ferrous chloride, and 25 g of aqueous 10% sodium L(+)-tartrate solution were added to it. Next, 100 g of aqueous 0.5% hydrogen peroxide solution was added thereto, taking 3 hours, and this was polymerized in a mode of emulsion polymerization. 5 minutes after the start of adding hydrogen peroxide, the system generated heat, and this confirmed the initiation of the emulsion polymerization. With that, the polymerization was continued while the outer temperature around the system was kept to fall between 50 and 55° C., and the polymerization temperature fell between 58 and 62° C. After the aqueous hydrogen peroxide solution was completely added, the system was kept for 1 hour until the polymerization was finished, and then the system was cooled. Thus obtained, the emulsion was evaluated, and its results are given in Table 1.

COMPARATIVE EXAMPLE 10 (ACCORDING TO EXAMPLE 2 OF JP-A 10-60055)

536 g of ion-exchanged water and 34 g of PVA-10 (having a degree of polymerization of 150 and a degree of saponification of 97.4 mol %) were fed into a 2-liter polymerization reactor of glass equipped with a reflux condenser, a thermometer, a nitrogen-introducing duct and an anchor-shaped stirrer, and completely dissolved at 95° C. After cooled to 70° C., 196 g of methyl methacrylate and 161 g of butyl acrylate were added to it, and then purged with nitrogen with stirring at 120 rpm. Next, 5 g of ferrous ammonium sulfate (aqueous 1% solution), 1 g of tert-butyl hydroperoxide (aqueous 70% solution) and 3.9 g of acetic acid were added to it. Next, 330 g of aqueous 2% formaldehyde-sodium sulfoxylate was added thereto, taking 2 hours, and this was polymerized in a mode of emulsion polymerization. After the polymerization heat was confirmed, a mixture of 170 g of ion-exchanged water, 10.7 g of tert-butyl hydroperoxide (aqueous 70% solution), 467 g of methyl methacrylate, 383 g of butyl acrylate and 7 g of n-dodecylmercaptan was added to it, taking 2 hours. After the addition, this was kept at 70° C. for 90 minutes, and the polymerization was thus finished and the system was then cooled. Thus obtained, the emulsion was evaluated, and its results are given in Table 2.

COMPARATIVE EXAMPLE 11 (ACCORDING TO EXAMPLE 3 OF JP-A 10-60055)

284 g of ion-exchanged water and 16 g of PVA-11 (having a degree of polymerization of 200 and a degree of saponification of 98 mol %) were fed into a 2-liter polymerization reactor of glass equipped with a reflux condenser, a thermometer, a nitrogen-introducing duct and an anchor-shaped stirrer, and completely dissolved at 95° C. After cooled to 40° C., 158 g of methyl methacrylate, 141 g of butyl acrylate, 0.9 g of n-dodecylmercaptan, 2.3 g of tert-butyl hydroperoxide (aqueous 70% solution), and 5 g of ferrous ammonium sulfate (aqueous 1% solution) were added to it, and then purged with nitrogen with stirring at 120 rpm. Next, 250 g of aqueous 5% formaldehyde-sodium sulfoxylate was added thereto, taking 2 hours, and this was polymerized in a mode of emulsion polymerization. After the addition, the system was kept at 40° C. for 90 minutes, and the polymerization was thus finished and the system was then cooled. Thus obtained, the emulsion was evaluated, and its results are given in Table 2.

COMPARATIVE EXAMPLE 12

An emulsion was produced in the same manner as in Comparative Example 11 except that PVA-12 (having a degree of polymerization of 200 and a degree of saponification of 88 mol %) was used in place of PVA-11. This was evaluated, and its results are given in Table 2.

COMPARATIVE EXAMPLE 13

An emulsion was produced in the same manner as in Comparative Example 11 except that PVA-13 (having a degree of polymerization of 500 and a degree of saponification of 98 mol %) was used in place of PVA-11. This was evaluated, and its results are given in Table 2.

COMPARATIVE EXAMPLE 14 (ACCORDING TO EXAMPLE 1 OF JP-A 2000-256424)

150 g of ion-exchanged water was put into a flask equipped with a stirrer, a thermometer, a reflux condenser, a dropping funnel and a nitrogen-introducing duct. 440 g of ion-exchanged water was added to 360 g of 2-ethylhexyl acrylate, 10 g of methacrylic acid and 30 g of PVA-1 in a separate beaker, and pre-emulsified with a homomixer and further emulsified with a high-pressure homogenizer to prepare an emulsion having a mean particle size of 0.4 µm. The emulsion and the flask were bubbled with nitrogen gas introduced thereinto at a rate of 100 ml/min, for about 2 hours. Then, the emulsion was dropwise added to the flask, taking for 4 hours, and 25 g of aqueous 10% formaldehyde-sodium sulfoxylate solution was dropwise added thereto, taking 5 hours. During this stage, the system was kept at 60° C.±2° C. After the addition, the system was kept at the temperature for 1 hour, and then cooled. Thus obtained, the emulsion was evaluated, and its results are given in Table 2.

COMPARATIVE EXAMPLE 15 (ACCORDING TO EXAMPLE 3 OF JP-A 2000-256424)

150 g of ion-exchanged water, 0.002 g of ferrous sulfide and 0.01 g of sodium ethylenediaminetetraacetate were put into a flask equipped with a stirrer, a thermometer, a reflux condenser, a dropping funnel and a nitrogen-introducing duct. 90 g of butyl acrylate, 180 g of ethyl acrylate, 100 g of acrylonitrile, 8 g of diacetonacrylamide, 5 g of itaconic acid, 30 g of PVA-1 and 440 g of ion-exchanged water were put into a separate beaker, and pre-emulsified with a homomixer and further emulsified with a high-pressure homogenizer to prepare an emulsion having a mean particle size of 0.4 µm. The emulsion and the flask were bubbled with nitrogen gas introduced thereinto at a rate of 100 ml/min, for about 2 hours. Then, the emulsion was dropwise added to the flask, taking for 4 hours, and 25 g of aqueous 0.4% cumene hydroperoxide solution and 25 g of aqueous 0.4% formaldehyde-sodium sulfoxylate solution were dropwise added thereto, taking 4 hours. During this stage, the system was kept at 32° C.±2° C. After the addition, the system was kept at the temperature for 1 hour, then cooled, and neutralized with 5 g of aqueous 25% ammonia added thereto. Thus obtained, the emulsion was evaluated, and its results are given in Table 2.

COMPARATIVE EXAMPLE 16 (ACCORDING TO EXAMPLE 1 OF JP-A 8-245706)

147 g of ion-exchanged water, 1.5 g of anionic surfactant, Newcol 707SF (from Nippon Emulsifier), and 0.5 g of polymerization initiator, ammonium persulfate were put into a polymerization reactor of glass equipped with a reflux condenser, a dropping funnel, a thermometer and a nitrogen-introducing duct, and heated up to 80° C. in a nitrogen atmosphere. Next, 100 g of butyl acrylate was continuously added thereto, taking 2 hours. During 20 minutes after the start of the addition, the reaction liquid became bluish white, and the inner temperature once rose. This confirmed the initiation of the polymerization. One hour after the start of the polymerization, 3 g of PVA-14 (having a degree of polymerization of 1000 and a degree of saponification of 96 mol %), as aqueous 10% solution thereof, was added to it. 2 hours after the continuous addition of butyl acrylate, the system was kept at the temperature, and the emulsion polymerization was thus finished. Thus obtained, the emulsion was evaluated, and its results are given in Table 2.

COMPARATIVE EXAMPLE 17 (ACCORDING TO EXAMPLE 3 OF JP-A 8-245706)

An emulsion was prepared in the same manner as in Comparative Example 16 except that PVA-1 was used in place of PVA-14. The emulsion was evaluated, and its results are given in Table 2.

COMPARATIVE EXAMPLE 18

An emulsion was prepared in the same manner as in Comparative Example 10 except that PVA-14' (having a degree of polymerization of 200 and a degree of saponification of 97.4 mold) was used in place of PVA-10. The emulsion was evaluated, and its results are given in Table 2.

COMPARATIVE EXAMPLE 19

An emulsion was prepared in the same manner as in Comparative Example 10 except that PVA-15 (having a degree of polymerization of 800 and a degree of saponification of 97.4 mol %) was used in place of PVA-10. The emulsion was evaluated, and its results are given in Table 2.

COMPARATIVE EXAMPLE 20

An emulsion was prepared in the same manner as in Example 1 except that PVA-16 (having a degree of polymerization of 100 and a degree of saponification of 88 mol %) was used in place of PVA-1. The emulsion was evaluated, and its results are given in Table 2.

COMPARATIVE EXAMPLE 21

An emulsion was prepared in the same manner as in Example 1 except that PVA-13 (having a degree of polymerization of 500 and a degree of saponification of 98 mol %) was used in place of PVA-1. The emulsion was evaluated, and its results are given in Table 2.

COMPARATIVE EXAMPLE 22

An emulsion was prepared in the same manner as in Example 1 except that PVA-17 (having a degree of polymerization of 2400 and a degree of saponification of 88 mol %) was used in place of PVA-1. The emulsion was evaluated, and its results are given in Table 2.

COMPARATIVE EXAMPLE 23

228 g of ion-exchanged water, and 6 g of ethylene-modified PVA (PVA-18) (having a degree of polymerization of 1500, a degree of saponification of 98 mol %, and a degree of modification with ethylene of 5.5 mol %) were fed into a 1-liter polymerization reactor of glass equipped with a reflux condenser, a dropping funnel, a thermometer and a nitrogen-introducing duct, and completely dissolved at 95° C. This was purged with nitrogen, and heated up to 70° C. with stirring at 200 rpm. Then, 3 g of aqueous 10% ammonium persulfate solution was added to it, and a mixed solution of 120 g of butyl acrylate, 80 g of methyl methacrylate and 1 g of n-dodecylmercaptan was added thereto, taking about 2 hours. Simultaneously with the monomer addition, 60 g of aqueous 10% solution of ethylene-modified PVA-18 that had been prepared separately was added to it, taking 2 hours. After the addition of the monomer and the aqueous ethylene-modified PVA solution, 3 g of aqueous 10% ammonium persulfate solution was added to it, and the inner temperature was kept to fall between 70 and 75° C. for 2 hours. The polymerization was thus completed, and then the system was cooled. As a result, an aqueous emulsion having a solid concentration of 37.8% was obtained. The aqueous emulsion was evaluated, and its results are given in Table 2.

EXAMPLE 13

The aqueous emulsion obtained in Example 1, and 2%, relative to the solid content of the emulsion, of fine silicic anhydride powder (having a mean particle size of 2 μm) were separately sprayed into hot air at 120° C. at the same time, and dried to give an emulsion powder.

The powder was resistant to blocking, and was well redispersible in water. The powder was redispersed in water, and the resulting emulsion (having a solid concentration of 50%) had good film strength, alkali resistance and film transparency, like the original aqueous emulsion.

TABLE 1

| | | | | | | | Monomer | | Chain Transfer | Iron | | Reducing |
|---|---|---|---|---|---|---|---|---|---|---|---|---|
| | | | | PVA | | | | method of | Agent | Compound | Peroxide | Agent |
| | | DP | DH (mol %) | Et (mol %) | 1,2-glycol (mol %) | method of addition | BA/MMA | monomer addition | (all at the beginning) | (all at the beginning) | (continuous addition) | (all at the beginning) |
| Ex. 1 | PVA-1 | 500 | 88 | — | 1.6 | all at the beginning | 50/50 (by weight) | all at the beginning | — | yes | HPO | TAS |
| Co. Ex. 1 | PVA-1 | 500 | 88 | — | 1.6 | all at the beginning | 50/50 (by weight) | continuous | — | yes | HPO | TAS |
| Co. Ex. 2 | PVA-1 | 500 | 88 | — | 1.6 | all at the beginning | 50/50 (by weight) | all at the beginning | — | no | HPO | TAS |
| Ex. 2 | PVA-1 | 500 | 88 | — | 1.6 | all at the beginning | 50/50 (by weight) | all at the beginning | n-dodecyl-mercaptan | yes | HPO | TAS |
| Co. Ex. 3 | PVA-1 | 500 | 88 | — | 1.6 | all at the beginning | 50/50 (by weight) | continuous | n-dodecyl-mercaptan | yes | HPO | TAS |
| Co. Ex. 4 | PVA-1 | 500 | 88 | — | 1.6 | all at the beginning | 50/50 (by weight) | all at the beginning | n-dodecyl-mercaptan | no | HPO | TAS |
| Ex. 3 | PVA-2 | 1000 | 88 | — | 1.6 | all at the beginning | 50/50 (by weight) | all at the beginning | n-dodecyl-mercaptan | yes | HPO | TAS |
| Co. Ex. 5 | PVA-2 | 1000 | 88 | — | 1.6 | all at the beginning | 50/50 (by weight) | continuous | n-dodecyl-mercaptan | yes | HPO | TAS |
| Ex. 4 | PVA-3 | 500 | 80 | — | 1.6 | all at the beginning | 50/50 (by weight) | all at the beginning | n-dodecyl-mercaptan | yes | HPO | TAS |
| Ex. 5 | PVA-4 | 500 | 93 | — | 1.6 | all at the beginning | 50/50 (by weight) | all at the beginning | n-dodecyl-mercaptan | yes | HPO | TAS |
| Ex. 6 | PVA-1 | 500 | 88 | — | 1.6 | all at the beginning | 50/50 (by weight) | all at the beginning | — | yes | KPS | SHS |
| Ex. 7 | PVA-1 | 500 | 88 | — | 1.6 | all at the beginning | 25/75 (by weight) | all at the beginning | n-dodecyl-mercaptan | yes | HPO | TAS |
| Co. Ex. 6 | PVA-5 | 500 | 88 | — | 1.6 | all at the beginning | 25/75 (by weight) | continuous | n-dodecyl-mercaptan | yes | HPO | TAS |
| Ex. 8 | PVA-1 | 500 | 88 | — | 1.6 | all at the beginning | 75/25 (by weight) | all at the beginning | n-dodecyl-mercaptan | yes | HPO | TAS |
| Ex. 9 | PVA-1 | 500 | 88 | — | 1.6 | all at the beginning | 50/50 (by weight) | all at the beginning | n-dodecyl-mercaptan | yes | HPO | TAS |
| Co. Ex. 7 | PVA-1 | 500 | 88 | — | 1.6 | continuous | 50/50 (by weight) | continuous | ethanol | no | APS | — |
| Co. Ex. 8 | PVA-6 | 100 | 88 | 0 | 1.6 | all at the beginning | 50/50 (by weight) | continuous | — | no | KPS | — |
| Ex. 10 | PVA-7 | 500 | 93 | 3 | 1.5 | all at the beginning | 50/50 (by weight) | all at the beginning | n-dodecyl-mercaptan | yes | HPO | TAS |
| Ex. 11 | PVA-8 | 500 | 88 | — | 2.5 | all at the beginning | 50/50 (by weight) | all at the beginning | n-dodecyl-mercaptan | yes | HPO | TAS |
| Ex. 12 | PVA-9 | 500 | 88 | 2 | 2.2 | all at the beginning | 50/50 (by weight) | all at the beginning | n-dodecyl-mercaptan | yes | HPO | TAS |

TABLE 1-continued

| | | | | | | | | | | | |
|---|---|---|---|---|---|---|---|---|---|---|---|
| Co. Ex. 9 | PVA-1 | 500 | 88 | — | 1.6 | all at the beginning | vinyl acetate | all at the beginning | — | yes | HPO | TAS |

| | Polymerization | | | Results of Emulsion Evaluation | | | | | |
|---|---|---|---|---|---|---|---|---|---|
| | Temperature Profile (°C.) | Polymerization Stability (g) | Film Strength (kg/cm2) | Alkali Resistance dissolution (%) | swelling (%) | Mechanical Stability (%) | Particle Size (μm) | Particle Size Distribution a | Film Transparency |
| Ex. 1 | 58-62 | 0.5 | 145 | 8 | 22 | 0.25 | 0.8 | 0.5 | ○ |
| Co. Ex. 1 | Gelled during emulsion polymerization, no emulsion obtained. | | | | | | | | |
| Co. Ex. 2 | Emulsion polymerization uncontrollable, the test stopped. | | | | | | | | |
| Ex. 2 | 58-62 | 0.1 | 155 | 5 | 17 | 0.1 | 0.5 | 0.9 | ○ |
| Co. Ex. 3 | Gelled during emulsion polymerization, no emulsion obtained. | | | | | | | | |
| Co. Ex. 4 | Emulsion polymerization uncontrollable, the test stopped. | | | | | | | | |
| Ex. 3 | 58-62 | 0.3 | 165 | 6 | 19 | 0.3 | 0.8 | 0.6 | ○ |
| Co. Ex. 5 | Gelled during emulsion polymerization, no emulsion obtained. | | | | | | | | |
| Ex. 4 | 58-62 | 0.1 | 150 | 7 | 20 | 0.13 | 0.4 | 0.8 | ○ |
| Ex. 5 | 58-62 | 0.3 | 150 | 6 | 19 | 0.3 | 0.8 | 0.6 | ○ |
| Ex. 6 | 57-63 | 0.7 | 130 | 9 | 28 | 0.4 | 0.7 | 0.6 | ○ |
| Ex. 7 | 58-62 | 0.3 | 150 | 8 | 22 | 0.22 | 0.5 | 0.8 | ○ |
| Co. Ex. 6 | 58-62 | After polymerization, the system gelled while cooled. | | | | | | | |
| Ex. 8 | 58-62 | 0.3 | 150 | 7 | 20 | 0.5 | 0.5 | 0.8 | ○ |
| Ex. 9 | 58-62 | 0.1 | 155 | 5 | 17 | 0.13 | 0.5 | 0.7 | ○ |
| Co. Ex. 7 | 75-85 | 1.2 | 120 | 15 | 33 | 2 | 1.2 | 0.08 | Δ |
| Co. Ex. 8 | 65-75 | 1.3 | 80 | 22 | 40 | 3.2 | 1.4 | 0.05 | x |
| Ex. 10 | 58-62 | 0.2 | 160 | 4 | 16 | 0.25 | 0.8 | 0.6 | ○ |
| Ex. 11 | 58-62 | 0.05 | 160 | 5 | 18 | 0.08 | 0.4 | 0.9 | ○ |
| Ex. 12 | 58-62 | 0.07 | 165 | 4 | 18 | 0.1 | 0.5 | 0.9 | ○ |
| Co. Ex. 9 | 58-62 | 0.05 | 150 | 70 | 60 | 0.28 | 0.7 | 0.2 | Δ |

HPO: hydrogen peroxide, KPS: potassium persulfate, APS: ammonium persulfate, SHS: sodium hydrogensulfite, TAS: sodium tartrate, BA: butyl acrylate, MMA: methyl methacrylate

TABLE 2

Condition of Emulsion Polymerization

| | PVA | | | | Monomer | | | Iron Compound | Peroxide | Reducing Agent |
|---|---|---|---|---|---|---|---|---|---|---|
| | | DP | DH (mol %) | Et (mol %) | method of addition | BA/MMA | method of monomer addition | Chain Transfer Agent | (all at the beginning) | (continuous addition) | (all at the beginning) |
| Co. Ex. 10 | PVA-10 | 150 | 97.4 | — | all at the beginning | 45/55 (by weight) | continuous | n-dodecyl-mercaptan | yes | t-butyl hydroperoxide | Rongalit |
| Co. Ex. 11 | PVA-11 | 200 | 98 | — | all at the beginning | 47/53 (by weight) | all at the beginning | n-dodecyl-mercaptan | yes | t-butyl hydroperoxide (all at the beginning) | Rongalit (successive addition) |
| Co. Ex. 12 | PVA-12 | 200 | 88 | — | all at the beginning | 47/53 (by weight) | all at the beginning | n-dodecyl-mercaptan | yes | t-butyl hydroperoxide (all at the beginning) | Rongalit (successive addition) |
| Co. Ex. 13 | PVA-13 | 500 | 98 | — | all at the beginning | 47/53 (by weight) | all at the beginning | n-dodecyl-mercaptan | yes | t-butyl hydroperoxide (all at the beginning) | Rongalit (successive addition) |
| Co. Ex. 14 | PVA-1 | 500 | 88 | — | continuous | 2-EHA97/MAA3 | continuous | — | no | t-butyl hydroperoxide | Rongalit |
| Co. Ex. 15 | PVA-1 | 500 | 88 | — | continuous | BA, EA, etc. | continuous | — | yes | cumene hydroperoxide | Rongalit |
| Co. Ex. 16 | PVA-14/emulsifier | 1000 | 96 | — | continuous | BA | continuous | — | no | KPS | — |
| Co. Ex. 17 | PVA-1/emulsifier | 500 | 88 | — | continuous | BA | continuous | — | no | KPS | — |
| Co. | PVA-14' | 200 | 97.4 | — | all at the | 45/55 | continuous | n-dodecyl- | yes | t-butyl | Rongalit |

TABLE 2-continued

| | PVA | Deg. Polym. | Saponif. | | Feeding 1 | Ratio | Feeding 2 | Mercaptan | | Peroxide | Reducing Agent |
|---|---|---|---|---|---|---|---|---|---|---|---|
| Co. Ex. 19 | PVA-15 | 800 | 97.4 | — | all at the beginning | 45/55 (by weight) | continuous | n-dodecyl-mercaptan | yes | t-butyl hydroperoxide | Rongalit |
| Co. Ex. 20 | PVA-16 | 100 | 88 | — | all at the beginning | 50/50 (by weight) | all at the beginning | — | yes | HPO | TAS |
| Co. Ex. 21 | PVA-13 | 500 | 98 | — | all at the beginning | 50/50 (by weight) | all at the beginning | — | yes | HPO | TAS |
| Co. Ex. 22 | PVA-17 | 2400 | 88 | — | all at the beginning | 50/50 (by weight) | all at the beginning | — | yes | HPO | TAS |
| Co. Ex. 23 | PVA-18 | 1500 | 98 | 5.5 | continuous | 60/40 (by weight) | continuous | n-dodecyl-mercaptan | no | KPS | — |

Results of Emulsion Evaluation

| | Polymerization Temperature Profile (°C) | Polymerization Stability (g) | Film Strength (kg/cm2) | Alkali Resistance dissolution (%) | swelling (%) | Mechanical Stability (%) | Particle Size (μm) | Particle Size Distribution a | Film Transparency |
|---|---|---|---|---|---|---|---|---|---|
| Co. Ex. 10 | 67-73 | 1.5 | 40 | 28 | 45 | 3.1 | 1.8 | 0.07 | Δ |
| Co. Ex. 11 | 35-45 | 3.5 | 45 | 27 | 48 | 2.7 | 2.3 | 0.05 | Δ |
| Co. Ex. 12 | 35-45 | 0.6 | 50 | 28 | 51 | 1.5 | 0.5 | 0.3 | ○ |
| Co. Ex. 13 | Gelled during emulsion polymerization, no emulsion obtained. | | | | | | | | |
| Co. Ex. 14 | 58-62 | 0.4 | 90 | 25 | 65 | 0.6 | 1.2 | 0.15 | Δ |
| Co. Ex. 15 | 30-34 | 0.5 | 80 | 32 | 60 | 0.7 | 1.3 | 0.2 | Δ |
| Co. Ex. 16 | 75-85 | 0.3 | 90 | 12 | 30 | 0.2 | 0.7 | 0.08 | Δ |
| Co. Ex. 17 | 75-85 | 0.2 | 80 | 14 | 33 | 0.2 | 0.5 | 0.1 | Δ |
| Co. Ex. 18 | 67-73 | 2 | 42 | 27 | 44 | 3 | 2 | 0.05 | Δ |
| Co. Ex. 19 | 67-73 | 2.3 | 45 | 25 | 42 | 3.2 | 2.3 | 0.03 | Δ |
| Co. Ex. 20 | 58-62 | 0.5 | 40 | 30 | 52 | 2.9 | 1 | 0.35 | ○ |
| Co. Ex. 21 | Gelled during emulsion polymerization, no emulsion obtained. | | | | | | | | |
| Co. Ex. 22 | Gelled during emulsion polymerization, no emulsion obtained. | | | | | | | | |
| Co. Ex. 23 | 70-75 | 0.8 | 130 | 10 | 26 | 0.3 | 1.4 | 0.05 | Δ |

HPO: hydrogen peroxide, KPS: potassium persulfate, APS: ammonium persulfate, SHS: sodium hydrogensulfite, BA: butyl acrylate, MMA: methyl methacrylate, 2-EHA: 2-ethylhexyl acrylate, MAA: methacrylic acid, EA: ethyl acrylate

INDUSTRIAL APPLICABILITY

The (meth)acrylic resin emulsion of the invention is excellent in all its film strength, film transparency and mechanical stability and further in its alkali resistance, and is therefore widely used for construction paints, paper processing agents and coating agents.

The invention claimed is:

1. A method for producing a (meth)acrylic resin emulsion, comprising:
   redox emulsion (co)polymerizing at least one monomer selected from the group consisting of an acrylate monomer and a methacrylate monomer, and, optionally, a further copolymerizable monomer in the presence of a vinyl alcohol polymer dispersant and a iron compound operable as a catalyst, said vinyl alcohol polymer dispersant having a degree of saponification of from 80 to 95 mol % and a degree of polymerization of from 400 to 2000,
   said emulsion (co)polymerizing comprising:
   i) feeding into a reactor at an initial stage (1) an iron compound, (2) the monomers, (3) the vinyl alcohol polymer to form a polymerizing system and (4) a reducing agent selected from the group consisting of L(+)-tartaric acid, sodium L(+)-tartrate, and a combination thereof, and
   ii) continuously or intermittently adding to said polymerizing system a peroxid,
   wherein said acrylate monomer is n-butyl acrylate and said methacrylate monomer is methyl methacrylate.

2. The method as claimed in claim 1, wherein said peroxide is present in an amount of from 0.1 to 5 wt %, relative to the weight of said at least one monomer.

3. The method as claimed in claim 1, wherein said peroxide is selected from the group consisting of hydrogen peroxide, ammonium persulfate, potassium persulfate, and t-butyl hydroperoxide.

4. The method as claimed in claim 1, wherein said peroxide is present in an amount of from 0.25 to 2 wt %, relative to the weight of said at least one monomer.

5. The method as claimed in claim 1, wherein the iron compound is present in an amount ranging from 1 to 50 ppm relative to the weight of said at least one monomer.

6. The method as claimed in claim 1, wherein the iron compound is present in an amount of from 5 to 30 ppm, relative to the weight of said at least one monomer.

7. The method as claimed in claim 1, wherein said vinyl alcohol polymer has a degree of saponification of from 83 to 93 mol %.

8. The method as claimed in claim 1, wherein said iron compound is at least one of ferrous chloride, ferrous sulfate, ferric chloride, ferric nitrate, or ferric sulfate.

9. The method as claimed in claim 1, wherein said iron compound is ferrous chloride.

10. The method as claimed in claim 1, wherein said iron compound is ferrous sulfate.

11. The method as claimed in claim 1, wherein said iron compound is ferric chloride.

12. The method as claimed in claim 1, wherein said iron compound is ferric nitrate.

13. The method as claimed in claim 1, wherein said iron compound is ferric sulfate.

14. The method as claimed in claim 1, wherein the vinyl alcohol polymer has a 1,2-glycol bond content of at least 1.9 mol %.

15. The method as claimed in claim 1, wherein the vinyl alcohol polymer has a 1,2-glycol bond content of at least 1.95 mol %.

16. The method as claimed in claim 1, wherein the vinyl alcohol polymer has a 1,2-glycol bond content of at least 2.0 mol %.

17. The method as claimed in claim 1, wherein the vinyl alcohol polymer has a 1,2-glycol bond content of at least 2.1 mol %.

* * * * *